Patented Oct. 15, 1935

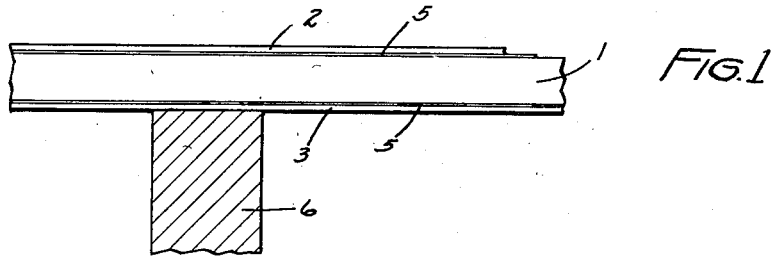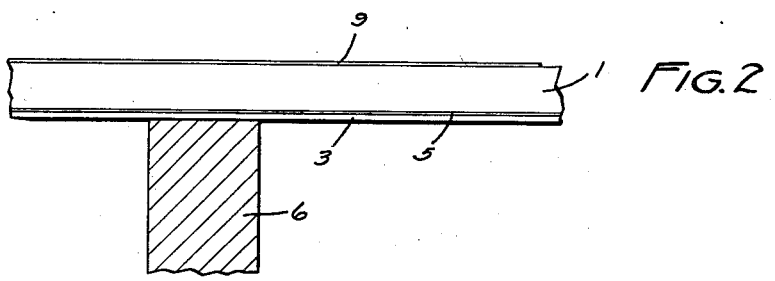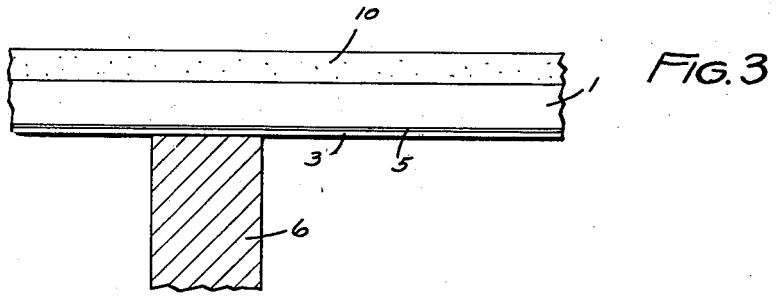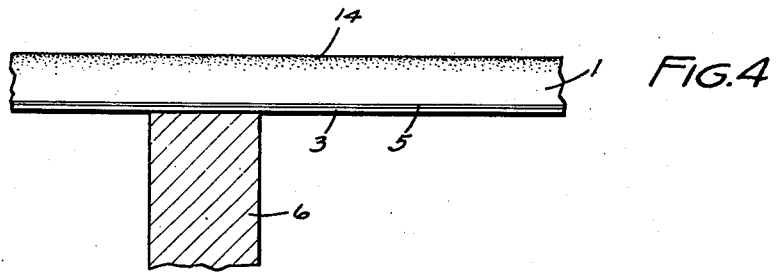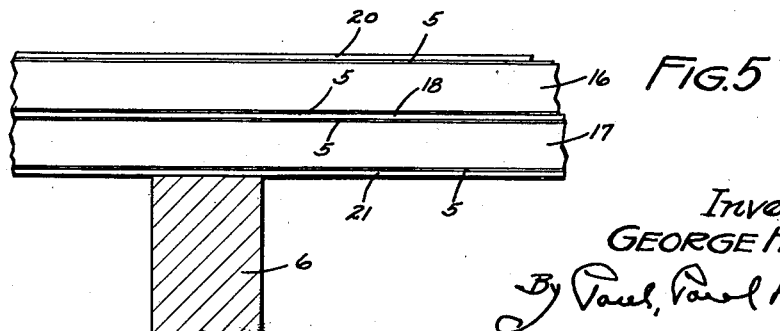

2,017,344

UNITED STATES PATENT OFFICE 2,017,344

FIREPROOF HEAT AND SOUND INSULATING BODY

George H. Ellis, St. Paul, Minn., assignor to The Insulite Company, Minneapolis, Minn., a corporation of Minnesota Application November 15, 1930, Serial No. 495,915

7 Claims. (Cl. 154—44)

This invention relates to the production of fire-resisting insulation for use in building construction, and has among its objects, to provide products or bodies which have maximum heat-insulating ability; minimum of moisture absorption ability; maximum fire-proofness; maximum of sound-deadening ability; a maximum of plaster binding ability; which are adapted to hold paint, and other like substances used for decorative purposes, and which can be very cheaply produced.

There have been many so-called fire-proof materials on the market. Some of these materials have been produced by impregnating wood or similar material by immersion in fire-resistant salts, or by brushing or spraying on one or both of opposite faces. Surfaces of wood have been painted, using what is known as fire-proof paint. These paints are objectionable in that in the presence of high temperature the paint scales off. When the impregnation is accomplished by immersion, or when any high hydroscopic substance is used, water absorption is relatively high and the insulating ability is materially reduced by raising heat conductivity. Moreover, surfaces treated in the ordinary manners above mentioned do not hold plaster, unless some special prepared sizing is used before the paint is applied.

I am also aware that attempts have been made to fire-proof wood, by the use of ammonium chloride, phosphate or sulphate, or a mixture of these substances. However, due to the excessively high cost and especially to the deliquescent nature of these chemicals, there has been little success in fire-proofing lumber. The use of chemicals having affinity for moisture is objectionable because moisture is attracted to such extent as to leach out the chemicals, and damage the varnish or paint. Moreover, expensive processes of impregnation in closed retorts and by the production of a partial vacuum in the retorts have been tried. In this case, after treatment, it is necessary to remove surplus chemical by centrifugal machines or more slowly by other methods, all of which materially increases the cost of production, and results in the production of a material having the objectionable qualities above mentioned, and which never have a high degree of sound and heat insulating ability.

I am aware that asbestos has been used and that it has been mixed with wood pulp with other chemicals. I am also aware that silicate of soda, and various other chemicals and fire-proofing salts have been used as saturants applied by rolling or brushing or by submerging the body therein, but these devices are either expensive or they fail of their hoped for results. All increase the sound and heat conductivity of the substance to which they are applied.

The gist of this invention is the connecting to a sheet or slab of non-fire-proof material such as pulped wood, a sheet of positively fire-proof material, by means of an air excluding fire-resistant cementitious substance, and/or the construction of a fire-proof body by alternate layers of positively fire-proof and non-fire-proof material.

Another discovery which is claimed is that a more fire-proof material is obtained, at minimum cost, when the non-fire-proof material has a thickness within the range of about one-eighth of an inch to one inch.

A feature is the fire-proofing of heat and sound insulating materials without decreasing the heat and sound conductivity of the material.

Advantages will be pointed out in the description of the drawing forming a part of this application and in said drawing:

Figure 1 is an edge view illustrating one form of product which is faced on opposite sides with cemented-on-fire-proof material, the product being laid against a joist, to further illustrate the method of application in formation of a wall;

Figure 2 is a similar view showing one side faced with fire-proof material and the other side painted;

Figure 3 is a view showing one side faced with fire-proof material and the other side coated with plaster;

Figure 4 is a view showing one side faced with fire-proof material, and the other treated or impregnated with fire-proofing chemicals; and Figure 5 is a view showing the product formed of alternate layers of fire-proof and combustible material.

Numeral 1 indicates an edge view of a heat and sound insulating body, adapted for building purposes. The material of this body or core is made from pulped and fiberized wood of any suitable kind. The wood pulp is well hydrolyzed and run from a pulper into any suitable machine such as a cylinder felting machine, shown in my Patent No. 1,672,249 for Apparatus for making composition boards or sheets. This felted product ordinarily has a specific gravity from .2 to .3 and is an excellent heat and sound insulating body. On opposite faces of this body are placed sheets of asbestos respectively indicated by numerals 2—3. Each sheet is cemented to the body 1 by a film 5 of heat-resisting, air-excluding material. The facing sheets 2 and 3 are formed of asbestos sheets, but obviously may be made from other equivalent mineral substances which can be pulped and made into sheets. The numeral 6 indicates one of the joists or studdings against which the laminated slab is placed.

A cement-like substance which has been found proper for this purpose is a mixture of three parts of silicate of soda and one part of whiting which acts as an air-excluding layer or film. That side of the board which is faced with fireproof material, is ordinarily laid against the studding, as shown in the drawing. In tests, when flame is applied to the surface, flaming of the core material does not take place but it is only charred or coked. The film of cementing material acts to vent the gases, but prevents entry of air, and thus flaming is always prevented. It will be noted that after conversion of the burnable material into a coke-like mass, this mass still has considerable strength.

In comparative tests, reed walls covered with plaster were submitted to a temperature of 1800 degrees applied by a blow torch for 32 minutes, and the wall burned through. In walls constructed according to the teachings of this invention, the application of 1800 degrees of heat for 80 minutes, only slightly discolored that facing against which the heat was applied, and although the combustible material between the facings was reduced to charcoal, there was no flaming. With tests extending over periods of 80 minutes at 1800 degrees F. and over periods of 50 minutes at 2000 degrees F., with the heat applied from the painted or plaster-coated side charring of the inflammable body took place, but the facings were only slightly discolored, although thickness of the asbestos paper was only .154 inch.

Although the material of the cementing film may be somewhat hydroscopic, yet the volume or thickness is so small that no appreciable amount of moisture absorption takes place. The asbestos paper is substantially non-hydroscopic.

Figure 2 indicates a modification, in which a piece of material 1 is faced on one side with the asbestos paper 3 cemented by a film 5 of mixture of sodium silicate and whiting in the same proportion as above specified. The opposite face of the body or that which forms the wall surface of the room is given a coat of paint indicated at 9. In this instance also the asbestos-covered side is arranged against the studding 6.

In Figure 3 the asbestos sheet is indicated at 3, the cementing film at 5, and the inner or room-surface is covered with plaster indicated at 10.

In Figure 4, the paper 3 is cemented as at 5 as in the other modifications, and the inner surface is impregnated or painted with a suitable fire resistant chemical indicated at 14. This chemical is applied by brushing or spraying, and is thus cheaply applied.

Figure 5 shows a modification in which the laminated body is made up of combustible elements 16—17 having a piece of asbestos paper 18 therebetween, opposite faces of the paper being cemented to corresponding faces of elements 16 and 17 by the air-excluding film material 5 as in the first case. The outer surfaces of each of the elements 16—17 are faced with asbestos sheet 20—21 connected by the cementing material 5. In this instance, there is a laminated product which is composed of alternate layers of asbestos paper and non-flammable material cemented by fire-resistant air-excluding film. The asbestos paper provides a surface which will hold plaster excellently and which will take decoration applied in any of the usual ways.

Generally speaking, the thicker the slab of non-fire-proof material, the greater the quantity of combustible material, and the greater the edge surface exposure for infiltration of air. Therefore, there is a thickness range for the product, if flaming is always to be prevented. I have discovered that this range is approximately one-fourth to three-fourths of an inch. It is to be remembered that this material is made in large sizes, and is often cut (as by sawing) into small pieces. Because of this, the edges are not covered but only the face sides of the board or sheet.

The use of ordinary chemical fire-proof or water-proof material causes the sheets to stick together, when piled, particularly when both of two opposite faces are so treated. In the present case, if the material is treated at all with any of the ordinary chemicals, only one face is so treated, and when the materials are piled one treated face is in contact with the asbestos paper or equivalent mineral fiber facing sheet, and sticking does not take place. This is also a valuable feature of the invention.

When the material is used as a plaster base, the cemented-on asbestos covering or facing is only used at one side, and the other side is covered by plaster or paint. When the material is used as a wall board, both sides are ordinarily covered with cemented-on asbestos paper, which paper can be painted, or decorated, in other manners.

If the asbestos paper or other mineral substance as a sheet is cemented to only one side of the body, this side is placed against the studding, but in all cases it is best to face both sides, either both sides with cemented-on asbestos paper or other equivalent mineral substance, or on respective sides with asbestos and plaster, or asbestos and paint, or asbestos and brushed or sprayed-on fire-resistant salts.

Another feature of the invention includes the introduction of vermiculite into the pulped wood stock in amounts varying from ten to thirty per cent of dry weight of the finished product. The composition of vermiculite is $SiO_2$ 33.35, $Al_2O_3$ 17.78, $Fe_2O_3$ 7.32, $FeO$ 2.11, $MgO$ 19.26, $H_2O$ 19.87. Vermiculite, as it is called in trade, is substantially fire-proof and tends to smother and stops any flaming of the material in which it is incorporated.

In all forms of the invention, a charring of the combustible material takes place without flaming, and with no after-glow.

I claim as my invention:

1. A heat and sound insulating body faced with fire-proof material which is sealingly secured to the body with a layer of fire resistant material, and composed of three parts of silicate of soda and one part of whiting.

2. A body for the purpose set forth composed of, a core of pulped woody material of a thickness within the range of one-eighth to one inch, faced on each of two opposite sides with thin sheets of asbestos paper, cemented by an air-excluding fire-resistant material composed of three parts of silicate of soda and one part of whiting.

3. A board having a core composed of pulped woody material of porous air-filled consistency faced on each of two opposite sides of greatest area with relatively thin sheets of incombustible material secured by a cementitious fire-resistant material consisting of three parts of silicate of soda and one part of whiting.

4. A fire-resistant, non-smouldering, sound-resistant body composed of a core of material of porous air filled consistency and containing vermiculite and faced on each of two opposite sides with sheets of incombustible material secured by a cementitious fire-resistant air-excluding material.

5. A fire-resistant, non-smouldering, sound-resistant body having a non-laminated core composed of pulped woody material of porous air filled consistency and containing vermiculite in amounts ranging from ten to thirty per cent of the dry weight of the finished product, said core being faced on each of two opposite sides with thin sheets of incombustible material secured by a film of cementitious fire-resistant material.

6. A fire-resistant, non-smouldering, sound-resistant body having a core composed of material of porous air filled consistency and containing vermiculite in amounts ranging from ten to thirty per cent of the dry weight of the finished product, said bore being faced with sheets of incombustible material secured by a film of cementitious fire-resistant material.

7. A heat and sound insulating body formed of two thick cores of sound and heat insulating material, the cores being connected by a sheet of fire-proof material secured at opposite sides to the cores by cementitious, fire-resistant, air-excluding material, the outermost face of each core being also faced with fire-proof material secured to the core by cementitious, fire-resistant, air-excluding material.

GEORGE H. ELLIS.